United States Patent
Lisby

(10) Patent No.: US 10,065,466 B2
(45) Date of Patent: Sep. 4, 2018

(54) UNIVERSAL HITCH SYSTEM

(71) Applicant: Ronald Lisby, Windham, NH (US)

(72) Inventor: Ronald Lisby, Windham, NH (US)

( * ) Notice: Subject to any disclaimer, the term of this patent is extended or adjusted under 35 U.S.C. 154(b) by 0 days.

(21) Appl. No.: 15/052,844

(22) Filed: Feb. 24, 2016

(65) Prior Publication Data
US 2017/0240011 A1  Aug. 24, 2017

(51) Int. Cl.
| | | |
|---|---|---|
| *B60D 1/00* | (2006.01) | |
| *B60D 1/44* | (2006.01) | |
| *B60D 1/06* | (2006.01) | |
| *B60D 1/48* | (2006.01) | |
| *B60D 1/52* | (2006.01) | |
| *B60D 1/54* | (2006.01) | |

(52) U.S. Cl.
CPC ............... *B60D 1/44* (2013.01); *B60D 1/06* (2013.01); *B60D 1/488* (2013.01); *B60D 1/52* (2013.01); *B60D 1/54* (2013.01)

(58) Field of Classification Search
CPC ..................................... B60D 1/44; B60D 1/52
USPC ....................... 280/491.5, 495, 496
See application file for complete search history.

(56) References Cited

U.S. PATENT DOCUMENTS

| | | | | |
|---|---|---|---|---|
| 4,032,170 A | * | 6/1977 | Wood ...................... | B60D 1/06 280/495 |
| 4,869,521 A | * | 9/1989 | Johnson ................... | B60D 1/54 280/491.1 |
| 4,950,010 A | | 8/1990 | Denny | |
| 5,149,122 A | * | 9/1992 | Helber ............... | B62D 53/0828 280/491.1 |
| 5,511,813 A | * | 4/1996 | Kravitz ................... | B60D 1/42 280/495 |
| 5,904,281 A | | 5/1999 | Mooers | |
| D431,506 S | | 10/2000 | Runfola | |
| 6,139,044 A | * | 10/2000 | Smith .................... | B60D 1/247 280/500 |
| 6,276,076 B1 | | 8/2001 | Quenzi et al. | |
| 6,386,514 B1 | | 5/2002 | Ray | |
| 6,540,277 B2 | * | 4/2003 | McCoy .................. | B60D 1/485 280/495 |
| D482,991 S | * | 12/2003 | Pancheri ...................... | D12/162 |
| 6,702,347 B1 | | 3/2004 | Hollinger et al. | |
| 6,742,799 B1 | * | 6/2004 | Hansen .................. | B60D 1/485 280/416.1 |
| 6,979,016 B1 | | 12/2005 | Wegener | |
| 7,100,936 B1 | * | 9/2006 | Cheng .................... | B60D 1/485 280/491.5 |
| 7,222,873 B2 | * | 5/2007 | Rodgers .................. | B60D 1/00 248/226.11 |

(Continued)

FOREIGN PATENT DOCUMENTS

EP           2284042           8/2006

*Primary Examiner* — Tony H Winner

(57) ABSTRACT

A universal hitch system includes a vehicle that has a frame and the frame has a front end. A hitch is removably coupled to the frame and the hitch is positioned on the front end. The hitch may have an implement removably coupled thereto. Thus, the vehicle may tow the implement. The hitch comprises a central member and a pair of end members. The central member has an adjustable width such that the central member accommodates a variety of frame widths. Each of the end members is removably coupled to the central member. Each of the end members is removably coupled to the frame.

3 Claims, 4 Drawing Sheets

(56) References Cited

U.S. PATENT DOCUMENTS

| | | | |
|---|---|---|---|
| 8,257,014 B2* | 9/2012 | Cullum | B60D 1/14 |
| | | | 280/500 |
| 8,714,592 B1* | 5/2014 | Thoreson | B60D 1/488 |
| | | | 280/769 |
| 9,272,592 B1* | 3/2016 | Kringstad | B60D 1/565 |
| 2009/0108566 A1* | 4/2009 | Asjad | B60D 1/488 |
| | | | 280/498 |

* cited by examiner

UNIVERSAL HITCH SYSTEM

BACKGROUND OF THE DISCLOSURE

Field of the Disclosure

The disclosure relates to hitch devices and more particularly pertains to a new hitch device for coupling a hitch to the front of any vehicle.

SUMMARY OF THE DISCLOSURE

An embodiment of the disclosure meets the needs presented above by generally comprising a vehicle that has a frame and the frame has a front end. A hitch is removably coupled to the frame and the hitch is positioned on the front end. The hitch may have an implement removably coupled thereto. Thus, the vehicle may tow the implement. The hitch comprises a central member and a pair of end members. The central member has an adjustable width such that the central member accommodates a variety of frame widths. Each of the end members is removably coupled to the central member. Each of the end members is removably coupled to the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
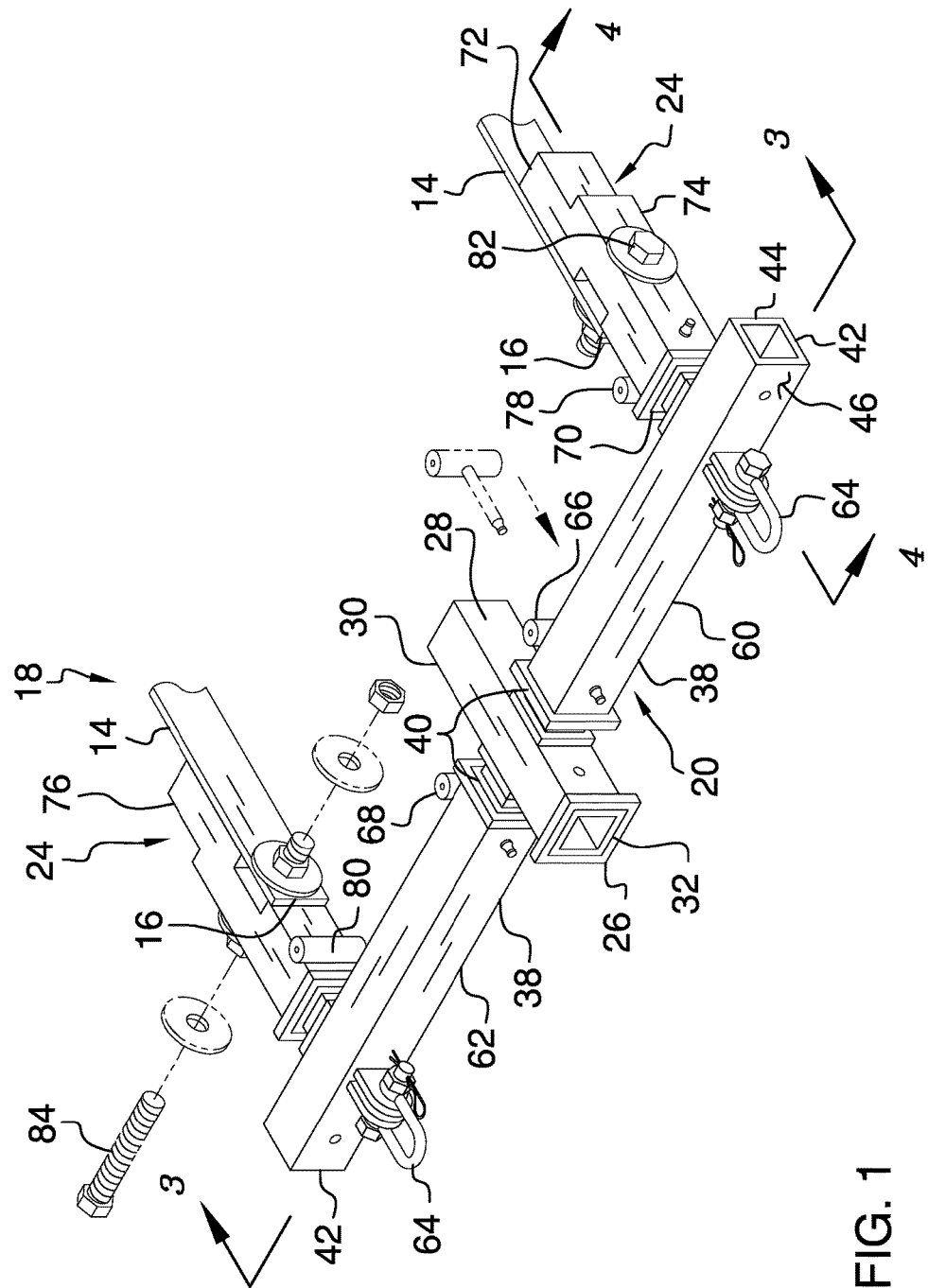
FIG. 1 is a top perspective view of a universal hitch system according to an embodiment of the disclosure.
Figure 2:
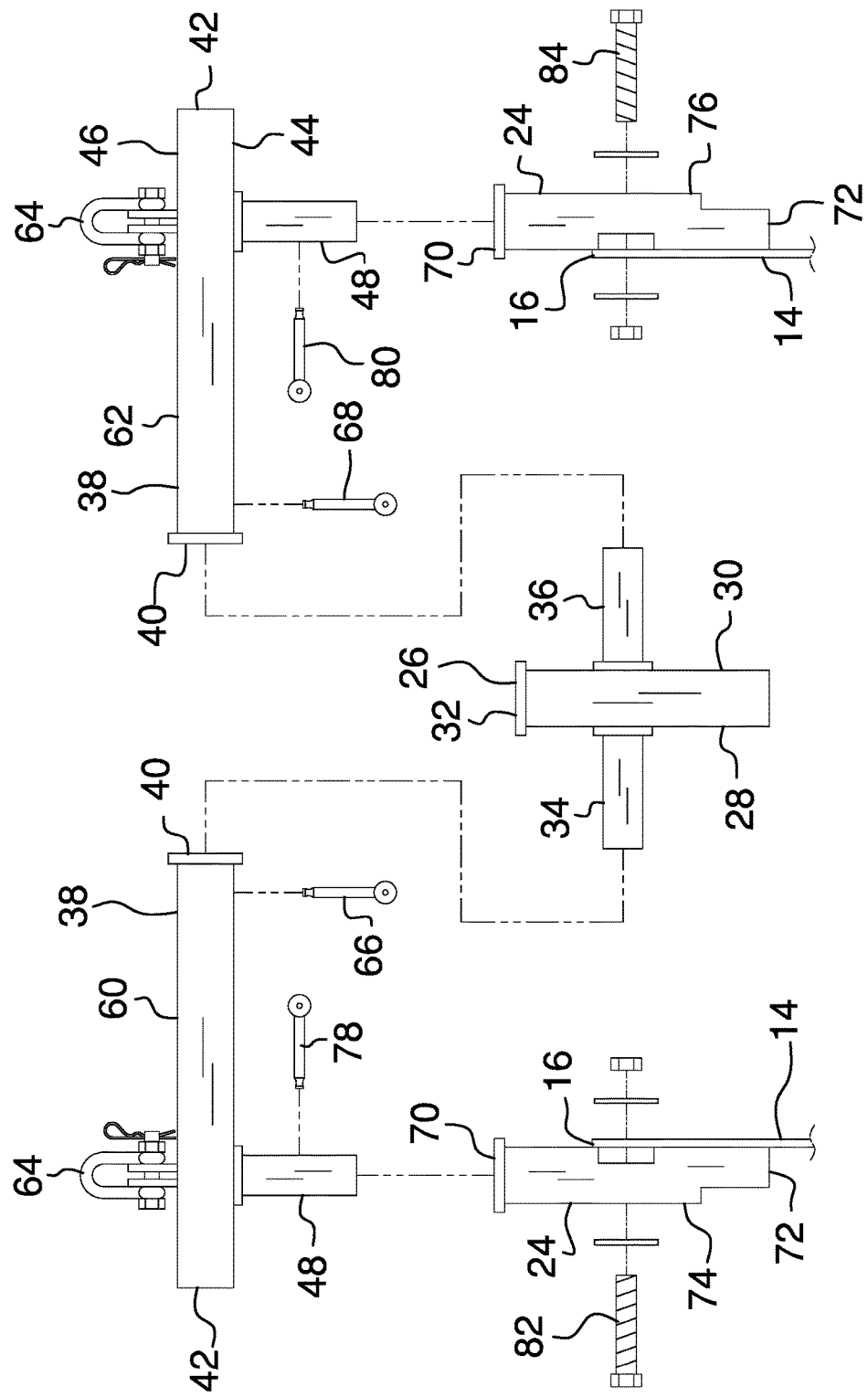
FIG. 2 is a top exploded view of an embodiment of the disclosure.
Figure 3:
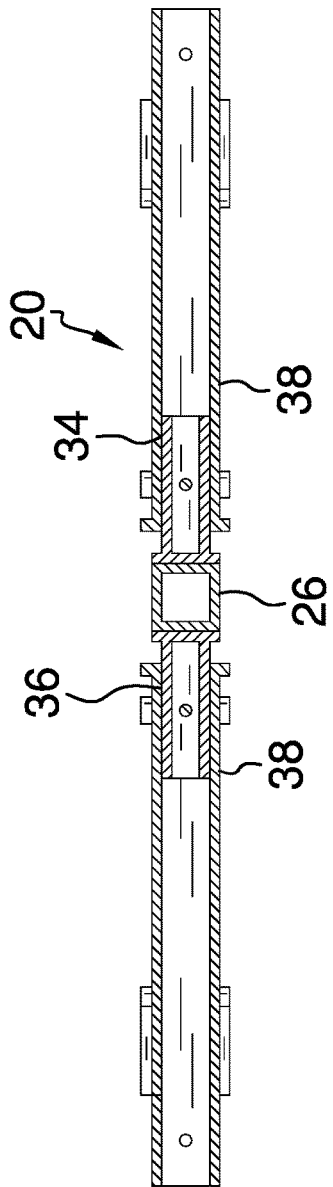
FIG. 3 is a cross sectional view taken along line 3-3 of FIG. 1 of an embodiment of the disclosure.
Figure 4:
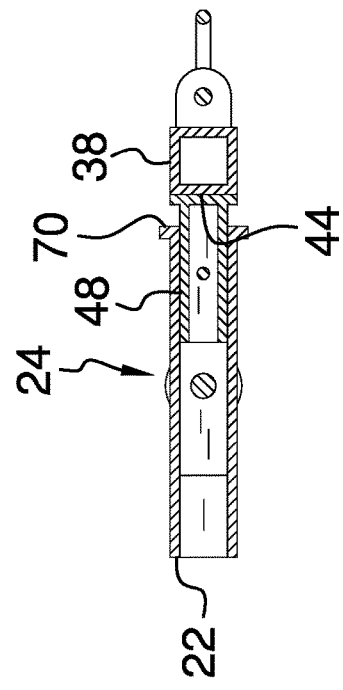
FIG. 4 is a cross sectional view taken along line 4-4 of FIG. 1 of an embodiment of the disclosure.
Figure 5:
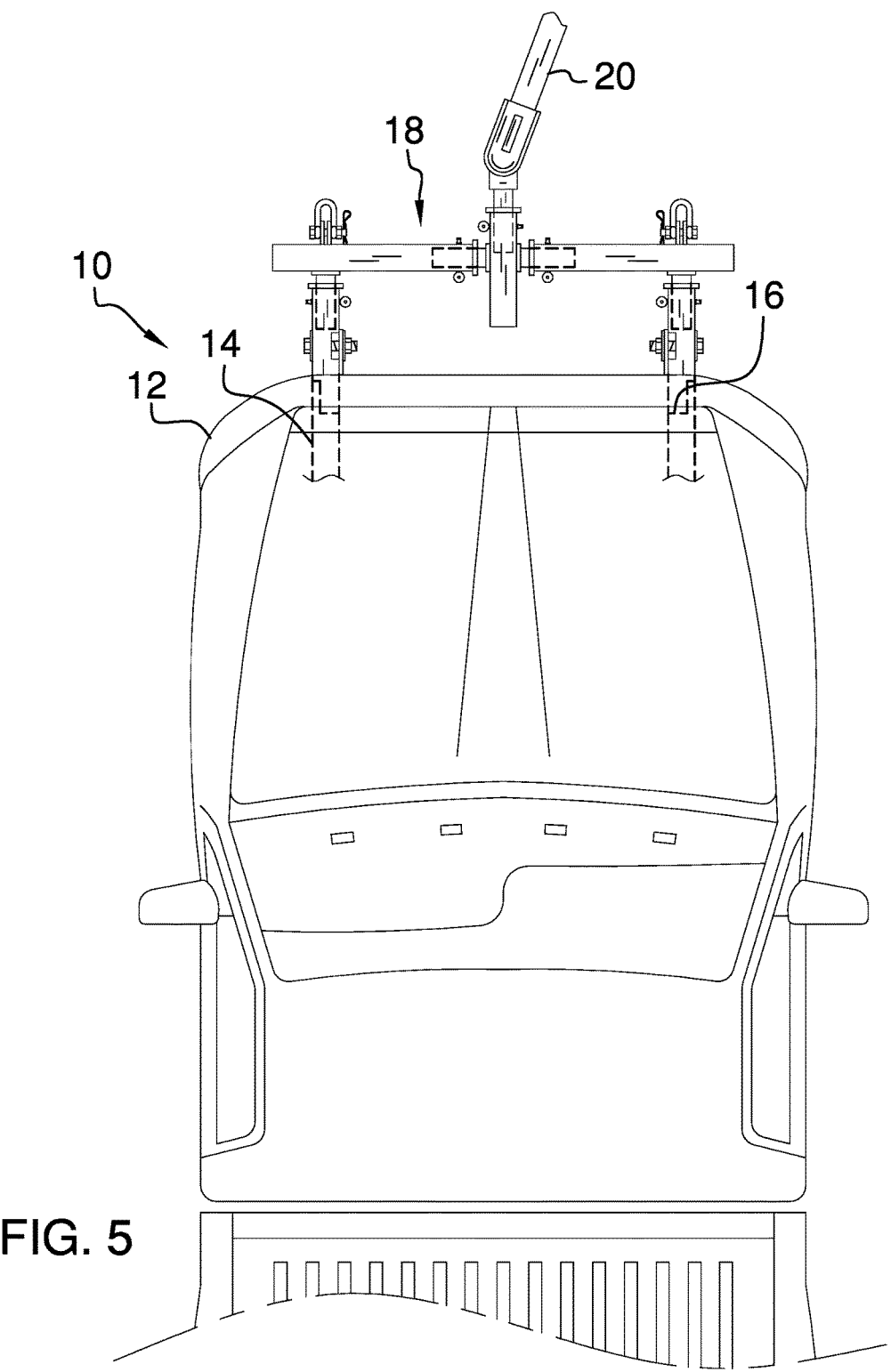
FIG. 5 is a perspective in-use view of an embodiment of the disclosure.

With reference now to the drawings, and in particular to FIGS. 1 through 5 thereof, a new hitch device embodying the principles and concepts of an embodiment of the disclosure and generally designated by the reference numeral 10 will be described.

As best illustrated in FIGS. 1 through 5, the universal hitch system 10 generally comprises a vehicle 12 that has a frame 14. The frame 14 has a front end 16. The frame 14 may include a snow plow mount or the like. The vehicle 12 may be a truck or the like.

A hitch 18 is provided and the hitch 18 is removably coupled to the frame 14. The hitch 18 is positioned on the front end 16. An implement 20 may be removably coupled to the hitch 18 thereby facilitating the vehicle 12 to tow the implement 20. The implement 20 may comprise a trailer that has a ball hitch or the like.

The hitch 18 comprises a central member 22 and a pair of end members 24. The central member 22 has an adjustable width to accommodate a variety of frame 14 widths. Thus, the hitch 18 may be removably coupled to a variety of makes and models of vehicles 12. Each of the end members 24 is removably coupled to the central member 22. Each of the end members 24 is removably coupled to the frame 14.

The central member 22 comprises a receiver 26 that has a first lateral side 28, a second lateral side 30 and a front end 32. The front end 32 is open to receive a hitch on the implement 20. A first stem 34 is coupled to and extends away from the first lateral side 28. A second stem 36 is coupled to and extends away from the second lateral side 30.

A pair of tubes 38 is provided. Each of the tubes 38 has a first end 40, a second end 42, a first surface 44 and a second surface 46. Each of the first end 40 and the second end 42 corresponding to each of the tubes 38 is open. Each of the tubes 38 includes a third stem 48. The third stem 48 is coupled to and extends away from the first surface 44 of an associated one of the tubes 38. The third stem 48 is positioned adjacent to the second end 42 of the associated tube 38.

The pair of tubes 38 includes a first tube 60 and a second tube 62. The first end 40 corresponding to the first tube 60 insertably receives the first stem 34. Thus, the first tube 60 is slidably coupled to the receiver 26. The first end 40 corresponding to the second tube 62 insertably receives the second stem 36. Thus, the second tube 62 is slidably coupled to the receiver 26.

A pair of rings 64 is provided. Each of the rings 64 is movably coupled to an associated one of the tubes 38. Each of the rings 64 may be selectively coupled to the implement 20. The rings 64 may be positioned on the second surface 46 of the associated tube 38.

A first pin 66 is removably extended through the first tube 60 and engages the first stem 34 at a selected point. Thus, the third stem 48 corresponding to the first tube 60 is retained a selected distance from the receiver 26. A second pin 68 is removably extended through the second tube 62 and engages the second stem 36 at a selected point. Thus, the third stem 48 corresponding to the second tube 62 is retained a selected distance from the receiver 26.

Each of the end members 24 has a primary end 70 and a secondary end 72. The primary end 70 corresponding to each of the end members 24 is open. The pair of end members 24 includes a first end member 74 and a second end member 76. The primary end 70 corresponding to the first end member 74 slidably receives the third stem 48 corresponding to the first tube 60. The primary end 70 corresponding to the second end member 76 slidably receives the third stem 48 corresponding to the second tube 62.

A third pin 78 extends through the first end member 74 and engages the corresponding third stem 48 at a selected point. Thus, the first end member 74 extends a selected distance from the first tube 60. A fourth pin 80 extends through the second end member 76 and engages the corresponding third stem 48 at a selected point. Thus, the second end member 76 extends a selected distance from the second tube 62.

A first bolt 82 extends through the first end member 74 and engages the frame 14. Thus, the hitch 18 is removably coupled to the frame 14. A second bolt 84 extends through the second end member 76 and engages the frame 14. Thus, the hitch 18 is removably coupled to the frame 14.

In use, each of the first tube 60 and the second tube 62 are slidably coupled to the receiver 26. Each of the first tube 60 and the second tube 62 are positioned at a selected point on the associated first stem 34 and second stem 36. Thus, the third stem 48 corresponding to each of the first tube 60 and the second tube 62 are aligned with the frame 14. Each of the end members 24 is slidably coupled to the associated first tube 60 and second tube 62.

Each of the end members 24 is coupled to the frame 14. Each of the end members 24 are positioned at a selected point on the associated third stem 48. Thus, central member 22 is spaced a selected distance from the front end 16 of the vehicle 12. The implement 20 is coupled to the receiver 26 and the implement 20 is towed. The hitch 18 is removed from the vehicle 12 at any selected time.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A universal hitch system comprising:
   a vehicle having a frame, said frame having a front end; and
   a hitch being removably coupled to said frame, said hitch being positioned on said front end, said hitch being configured to have an implement being removably coupled thereto thereby facilitating said vehicle to tow the implement, said hitch comprising a central member and a pair of end members, said central member having an adjustable width such that said central member accommodates a variety of frame widths, each of said end members being removably coupled to said central member, each of said end members being removably coupled to said frame;
   wherein said central member comprises a receiver having a first lateral side, a second lateral side and a front end, said front end being open wherein said front end is configured to receive a hitch on the implement, said receiver having a first stem being fixed to and extending perpendicularly away from said first lateral side, said receiver having a second stem being fixed to and extending perpendicularly away from said second lateral side, said first stem and said second stem being linearly aligned across said receiver; and
   a pair of tubes, each of said tubes having a first end, a second end, a first surface and a second surface, each of said first end and said second end corresponding to each of said tubes being open, each of said tubes having a third stem being fixed to and extending perpendicularly away from said first surface, said third stem being positioned adjacent to said second end of said associated tube, said pair of tubes including a first tube and a second tube, said first end corresponding to said first tube insertably receiving said first stem such that said first tube is slidably coupled to said receiver perpendicular to said receiver, said first end corresponding to said second tube insertably receiving said second stem such that said second tube is slidably coupled to said receiver perpendicular to said receiver.

2. The system according to claim 1, further comprising a pair of rings, each of said rings being movably coupled to an associated one of said tubes wherein each of said rings is configured to be selectively coupled to the implement.

3. The system according to claim 1, further comprising:
   a first pin being removably extended through said first tube and engaging said first stem at a selected point such that said third stem corresponding to said first tube is retained a selected distance from said receiver, and
   a second pin being removably extended through said second tube and engaging said second stem at a selected point such that said third stem corresponding to said second tube is retained a selected distance from said receiver.

* * * * *